Fig. 1.

INVENTORS.
Arthur P. Fraas &
Carroll B. Mills
BY
ATTORNEY

Nov. 21, 1961   A. P. FRAAS ET AL   3,009,866
NEUTRONIC REACTOR
Filed Nov. 27, 1957   7 Sheets-Sheet 2

INVENTORS.
Arthur P. Fraas &
BY  Carroll B. Mills
ATTORNEY

INVENTORS.
Arthur P. Fraas &
BY Carroll B. Mills

ATTORNEY

Nov. 21, 1961     A. P. FRAAS ET AL     3,009,866
NEUTRONIC REACTOR Filed Nov. 27, 1957     7 Sheets-Sheet 6

EXTERNAL FUEL VOLUME = 4 FT³     REFLECTOR THICKNESS = 30 CM

INVENTORS.
Arthur P. Fraas &
BY    Carroll B. Mills

ATTORNEY

United States Patent Office 3,009,866
Patented Nov. 21, 1961

3,009,866
NEUTRONIC REACTOR
Arthur P. Fraas, Knoxville, Tenn., and Carroll B. Mills, Los Alamos, N. Mex., assignors to the United States of America as represented by the United States Atomic Energy Commission
Filed Nov. 27, 1957, Ser. No. 699,428
8 Claims. (Cl. 204—193.2)

Our present invention relates generally to the neutronic reactor art and more particularly to novel thermal-epithermal, circulating-fuel reactors which are characterized by the absence of a moderator in the fuel region.

As used in this application, the following terminology is defined below:

Thermal Neutrons—Neutrons having a substantially Maxwellian number-energy distribution characteristic about an energy value equal to $kT$, where $k$ is a constant and T is the temperature in degrees Kelvin. ($kT$=0.025 electron volt at 15° C.)

Slow neutrons—Neutrons having a kinetic energy less than one electron volt.

Fast neutrons—Neutrons having a kinetic energy greater than 100,000 electron volts.

Intermediate neutrons—Neutrons having a kinetic energy in the range between that of fast neutrons and that of slow neutrons.

Epithermal neutrons—Neutrons having a kinetic energy of greater than $5k$ Telectron volts but less than 0.5 electron volts.

Effective multiplication factor ($k_{eff}$)—The ratio of the number of neutrons produced on the average in one generation to the number of neutrons which are absorbed and/or leak out on the average in the preceding generation.

Infinite multiplication factor ($k\infty$)—The ratio of the number of neutrons produced in one generation to the number of neutrons absorbed in the preceding generation in an infinite system.

Reactor active portion—That inner portion of a neutronic reactor which contains fissionable material and is characterized by a multiplication constant ($k$) greater than unity. The symbol ($k\infty$) is sometimes employed in the literature to represent the multiplication constant ($k$).

Moderator material—A non-gaseous material for which the ratio $$\frac{\xi \sigma_s}{\sigma_a}$$

is greater than 10, wherein $\xi$ is the average loss in the logarithm of the energy of a fast neutron per elastic collision within the material, $\sigma_s$ is the thermal neutron elastic scattering cross section per atom of the material, and $\sigma_a$ is the thermal neutron absorption cross section per atom of the material.

Slow neutron absorber—An atomic nucleus having a thermal neutron absorption cross section greater than one hundred barns ($>100 \times 10^{-24}$ cm.$^2$).

Specific power—Kilowatts heat output of the reactor per kilogram of fissionable material present in the active portion.

As is now well known, by amassing sufficient fissionable material under appropriate conditions, a self-sustaining, neutron-reactive assemblage may be formed, which assemblage, by reason of its ability to generate neutrons at an equal or greater rate than they are being lost by absorption or leakage, is capable of maintaining a self-sustained chain reaction of neutron induced fission. Every reactor has an inherent neutron energy level at which it operates, that is, a neutron energy range within which a majority of fissions occurs. The inherent energy level of a reactor is dependent primarily upon the ratio of moderator material to fissionable material in the active portion of that reactor. If very little or no moderator is present in the active portion, the neutron induced chain reaction will be maintained primarily by fast neutrons. In contradistinction, if the moderator to fissionable fuel ratio is large, the fission reaction will be sustained in a large part by neutrons of thermal energy. Moderator to fuel ratios falling between the fast and thermal ratios will occasion a fission reaction in the intermediate neutron energy range. Neutronic reactors are broadly classified as fast, thermal, and intermediate, the designation being dependent upon the inherent neutron energy level at which the reactor is functioning.

Each type of reactor, fast, thermal, and intermediate, has advantages and disadvantages particular to that type. Fast reactors manifest one property, that of small physical size, which is both advantageous and disadvantageous simultaneously. Small physical size indicates a small shielding weight, since the weight of shielding required for any given source of radiation increases exponentially with an increase in any linear dimension of that shape. Low shielding weight is considered an advantage in the majority of reactor applications but the small size of a fast reactor introduces a heat transfer problem that is certainly disadvantageous. One can readily appreciate the fact that heat transfer area decreases drastically with a decrease in any linear dimension. Other disadvantages of the fast reactor are the necessity of a high fuel inventory, the necessity of using a non-moderating coolant and the difficulty of control. Control of fast reactors differs from thermal and intermediate reactors in that the fact reactor cannot easily be controlled by simple absorption of neutrons because absorption cross sections of materials for fast neutrons are generally very small in comparison to the absorption cross sections of the same materials for slower neutrons.

Thermal reactors display properties which are in many instances exactly opposite to the characteristics of fast reactors. For instance, in prior-art thermal reactors, the necessity of a large amount of moderator material dispersed in the fuel region has necessitated a very large core size. A large core size is a disadvantage when reactor shielding is considered but becomes an advantage when heat transfer is considered. Also, thermal reactors are generally controlled by absorption of thermal neutrons which allows the core to be fabricated rigidly with no moving parts other than the control rods. In a thermal reactor, the coolant may, and usually does have, good moderating properties as evidenced by the water cooled and moderated research reactors of recent years.

Intermediate reactors operate on neutrons having energies covering the entire energy spectrum between fast and thermal, thus control by absorption is more practical in intermediate reactors than in fast reactors. In many ways the intermediate reactor is a compromise between the widely removed encampments of thermal and fast. The intermediate reactor can be made smaller than the thermal reactor and it is somewhat larger than the fast reactor but the size of prior-art intermediate reactors is still too great for aircraft applications.

Thermal and intermediate neutronic reactors may be classified into two other general categories which are homogeneous and heterogeneous. These two classifications refer to the relative arrangement of moderator and fuel within the active portion of the reactor. In a heterogeneous reactor, the fuel and moderator are separate physically, and are usually arranged in some geometric pattern or lattice. The natural-uranium, graphite-moderated reactor is a good example of the heterogeneous system.

A homogeneous reactor has its fuel and moderator intimately mixed in a homogeneous manner. Uranium salts in heavy or light water solutions are exemplary of the homogeneous system. Here, as before in the neutron energy classification scheme, the nuclear engineer must choose the reactor type on the basis of desired operating characteristics, but he has been, heretofore, limited to the characteristics of either heterogeneous or homogeneous, after he has made his choice. The following are some of the advantages of the heterogeneous reactor: a great wealth of information is available; the reactor is usually very stable under operating conditions; and pressures may be maintained at low values if the proper coolant is used. Homogeneous reactors, as they are now known, usually have high pressures associated with their operation since water is usually used as the moderator and primary coolant, but the liquid fuel homogeneous reactor presents an advantage of self control which tends to negate the pressure disadvantage. Also, the fuel being in a slurry or solution, it can be circulated to a fuel reprocessing plant at a position separate from the reactor, where fission products can be removed in a continuous process.

Each type of reactor, either heterogeneous or homogeneous, has a multitude of advantages and disadvantages which have not been discussed, but the important point is that the nuclear engineer has had to make a definite choice between the several reactor types and then accept the disadvantages of that type in order to obtain the desired advantages. Consequently, the adaptation of the neutronic reactor for many beneficial uses has been delayed because reactors having the proper operating characteristics have been unavailable.

For example, since the discovery of the fission reaction and the accompanying release of energy, man has been looking toward the day when the fission reaction can be adapted so that the released energy can be placed in the service of humanity for many beneficial purposes. The feasibility of electrical power production at a central station was quickly proven, and propulsion of a naval vessel by a neutronic reactor has been spectacularly demonstrated. Nuclear powered air flight has been and still is an unrealized dream, which has been unfulfilled primarily because a reactor with the proper operating characteristics has been unavailable. The dilemma which has faced the designer of neutronic reactors for aircraft use can be summarized quickly; the designer has had to accept too many disadvantages to obtain the desired advantages.

A primary characteristic of a neutronic reactor for aircraft is low weight. The reactor and its accompanying accessories together with the engines must be at least as light as the chemical engines and chemical fuel that it replaces. A great portion of the weight of a reactor is due to shielding and the weight of shielding varies as some power greater than one with the linear dimensions of the reactor. It is, therefore, dictated that the core of an aircraft reactor be as small as possible. A fast reactor has a very small core and a designer with only size as a criterion would select the fast reactor for aircraft adaptation.

Unfortunately, size and weight are not the only criteria. Reactor controlability is another very important characteristic which must be considered. In the prior art, the thermal reactor has been the most easily controlled reactor because control can be achieved by slow neutron absorption. With only controlability as a criterion, the designer would choose the thermal reactor for aircraft propulsion. Here the dilemma is diabolically apparent: If one accepts the thermal reactor for ease of control, one must also accept the added and intolerable weight. If the fast reactor is chosen, for weight considerations, the difficulty of control must be accepted. In the prior art, there was no solution to the dilemma.

Other characteristics of an aircraft reactor complicate the problem to a greater degree. High temperatures must be achieved in order to extract the power efficiently. A high specific power is necessary in order to make efficient use of the core volume and the investment in the fuel inventory. In this case the thermal reactor would be selected since the highest specific power can be obtained in a thermal reactor. A low fuel inventory is also desirable in view of economic considerations. Here, a thermal reactor is indicated and here, as before, the weight of prior-art thermal reactors is intolerable. The selection of an aqueous homogeneous reactor is impossible at the present time since the temperatures are far too low for efficient power extraction and the pressures are much too high. It requires only a superficial examination of the prior art to conclude that a reactor did not exist which satisfied the desirable criteria for aircraft reactors. A light, easily-controlled, high-temperature, low-pressure reactor suitable for aircraft incorporation did not exist prior to our invention. Other factors such as stability under motion induced forces and inherent safety were not met by prior art reactors; and it will be obvious from the following description of our invention that a new concept in the nuclear physics of a neutronic reactor was required in order to solve the dilemma imposed by the stringent requirements of an aircraft reactor. The reactor which we have invented is especially adaptable to the airplane, but it is equally useful in any reactor application wherein a light, easily-controlled reactor is desirable. It may prove useful as a portable package-power reactor, a power reactor located at a central station, or as a source of energy for the propulsion of land and sea craft.

It is, therefore, a general object of our invention to provide a novel type of neutronic reactor having associated therewith operating characteristics which have been impossible, heretofore, to realize in a single neutron reactive assemblage.

Another object of our invention is to provide a novel neutronic reactor which is characterized by the absence of a moderator in its fueled portion.

A further object of our invention is to provide means for sustaining a thermal-epithermal neutron fission reaction within a volume smaller and at specific powers higher than have been previously practicable.

A further object of our invention is to provide a novel neutronic reactor having a mechanically simple core adapted to withstand sudden changes in applied external force without excessive reactivity excursions.

A still further object of our invention is to provide a novel neutronic reactor capable of propelling a heavier-than-air craft.

These and other objects of our invention will become apparent from the following detailed description of my invention taken in connection with the accompanying drawings wherein:

In accordance with our invention a centrally located, solid, substantial mass of moderator material is surrounded by a second mass of moderator material of substantial thickness, thereby forming an annular passageway between the central and surrounding masses; the two masses comprising the principal moderant of the reactor which is adapted to sustain a chain fission reaction utilizing a circulating, fissionable fuel-bearing liquid within its annular passageway. The fissionable material need not contain a good moderator, the moderation to thermalize the fission reaction being achieved by means of reflector-moderation. If the size of the annular portion is sufficiently large and if the fissionable material is present at a sufficient concentration within the passageway, then a fission chain reaction will be initiated, accompanied by the usual release of energy and neutrons.

The released neutrons are fast neutrons and tend to diffuse through the fuel and into the surrounding moderator where they are slowed to the thermal-epithermal energy range by elastic scattering collisions between the neutrons and the moderator nuclei. A portion of the neutrons will be lost by absorption in the moderator but if the moderator is selected properly, enough neutrons will be reflected back into the fuel at thermal and epithermal energies to cause further fissioning of the fuel. Of course, a portion of the neutrons will escape from the moderator without being reflected back into the fuel region and some neutrons will be reflected back into the fuel region before reaching epithermal energies or may be lost by absorption in any parasitic materials which may be present, but we have discovered that the probability of thermal and epithermal neutrons being reflected back into the fuel region is sufficiently large so that a neutron-induced chain reaction can be sustained. Once the neutrons have been reflected back into the fuel region at low energies, the probability of their escape from the region before inducing fission is relatively small due to the high fission cross-section of the fuel for thermal-epithermal neutrons. The fissionable material for our reactor is preferably in the form of a liquid fuel which is circulated through the annular passageway. The energy released by fission in the active portion of the reactor may be removed by any convenient manner, but we have found it preferable to circulate the fuel itself in liquid form through an external heat exchanger where it can be cooled by another heat exchange medium.

We have found that our invention, when incorporated into a nuclear propulsion unit for aircraft, meets all of the criteria in which we have set forth previously in this application. A reflector-moderated, spherical, neutronic reactor which is capable of producing approximately 60 megawatts of power can be made with a core diameter of only 21 inches. The small physical size indicates a low shielding weight and the fuel inventory required to sustain the chain reaction is low enough to make the reactor economical to operate. If a molten salt fuel is used in the reactor, temperatures of 1500° F. can be achieved at a very low pressure within the mechanically simple core.

Control is simplified because the reactor is virtually self-controlling at a given power level, if a liquid fuel is used. An increase in temperature, within the fuel region of the reactor, causes a portion of the fuel to be forced out of the region as a result of the thermal expansion of the liquid fuel, thereby causing a reduction in the effective multiplication factor. The reactor is essentially a thermal-epithermal reactor which indicates that regulation by thermal neutron absorption is possible.

The surrounding mass of moderator-reflector in our reactor provides advantages which are very attractive to the design engineer. The primary advantage manifested by the reactor is its triple function. Firstly, the reflector serves as a means for neutron moderation and neutron reflection; secondly, it operates as a fairly effective shield; and thirdly, the reflector effects a delay in the neutron generation time. In diffusing through the reflector, the neutrons are delays sufficiently so that the prompt neutron generation time is approximately $10^{-4}$ sec. while fast reactors are about $10^{-7}$ sec. Without the delay feature of the reflector, the prompt neutron generation time for a reactor having the same neutron energy spectrum as the present reactor would be about $10^{-5}$ sec. An increase in the prompt neutron generation time by a factor of ten is very advantageous in terms of safety and control.

Any moderator which is compatible with the temperatures and other physical conditions encountered during operation of the reactor is suitable for use in the class of reactors which we provide. Since the advantages derived from the use of our invention includes the advantage of high temperature operation, high temperature moderators such as beryllium, beryllium oxide, and graphite are materials which are preferable. Other materials such as the various metallic hydrides are also suitable for use in our reactor.

Any number of liquid fuels may be used in the class of reactors which we have provided. Fused salts and molten metals are preferable, however, since the advantage of high temperature operation can be utilized with these materials. Among the fused salts, the fused fluoride salts are particularly well suited, since these salts manifest physical properties which are attractive.

It should be stressed at this point that the reactors which we have provided can also be operated with low temperature moderators and fuels. Although our reactors are particularly adaptable to high temperature applications, they are operable and advantageous at low temperatures as well as the desirable high temperatures, and our invention should not be interpreted as being applicable to a high temperature class of reactors only. The description which follows is merely an illustrative example setting forth one embodiment of the many reactor designs which may be made using the principles of our invention. The particular structural materials, operating procedures, assembly schemes, methods of fabrication, and physical dimensions, given in the following description, are single choices of many choices available to those skilled in the art, in the light of our description herein.

Figure 1:
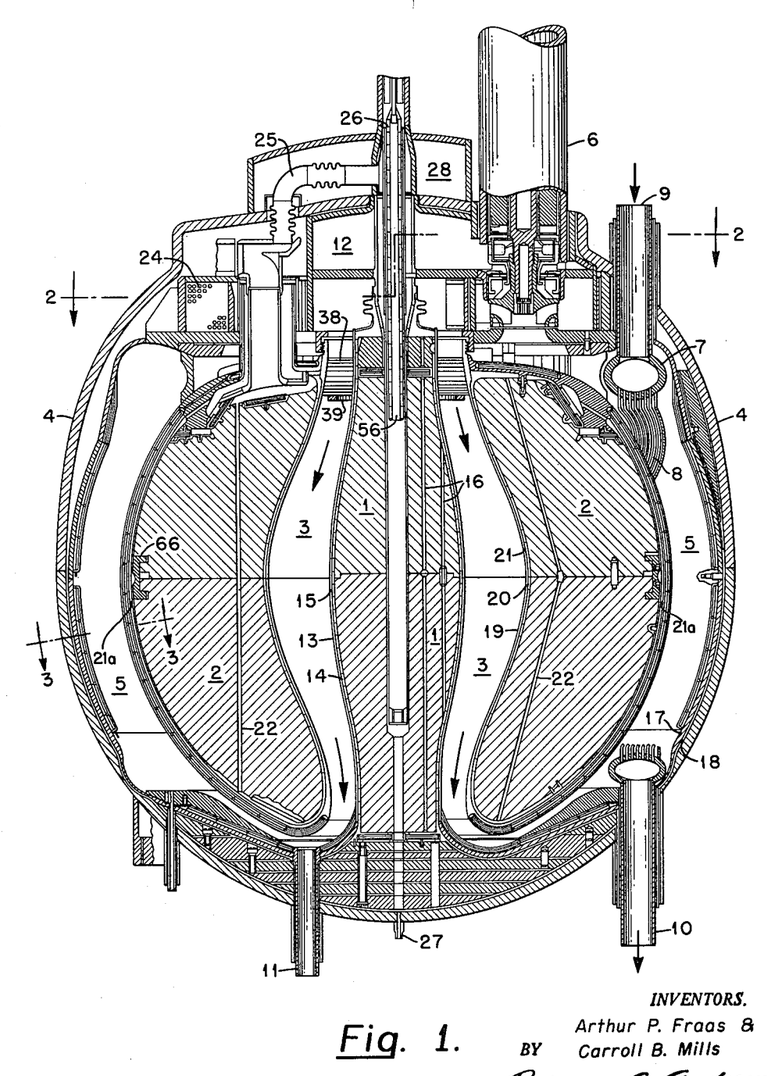
FIG. 1 is a vertical cross-section of the core of a reactor which is one embodiment of our invention, taken along line 1—1 of FIG. 2.
Figures 2, 4:
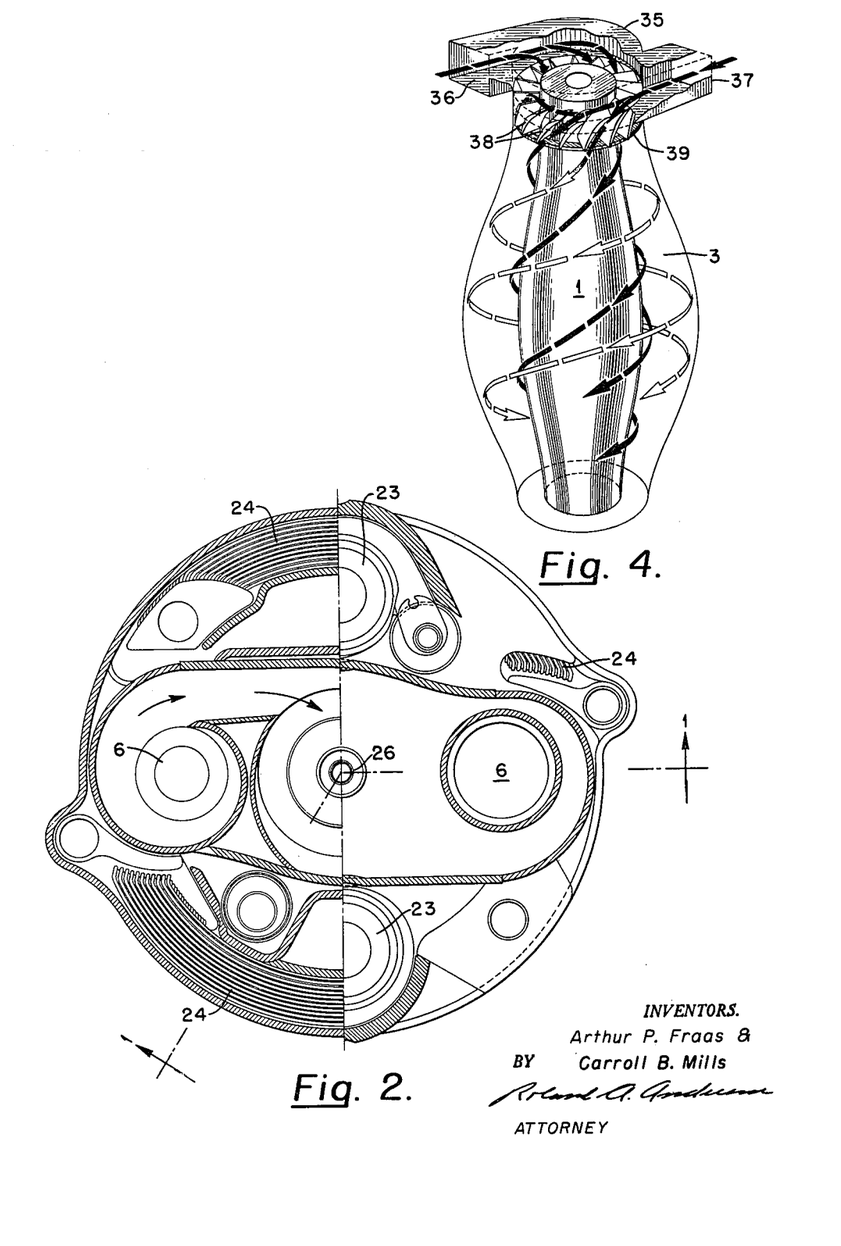
FIG. 2 is a horizontal cross-section of the pump region at the top of the reactor taken along 2—2 of FIG. 1.
FIG. 4 is a pictorial view of the fuel annulus of the reactor showing the header arrangement at the inlet to the fuel annulus.

FIG. 1 is a vertical cross sectional view, taken along line 1—1 of FIG. 2, of a reactor core utilizing our invention. The sectional cut has been made in such a way that each important component of the reactor is shown in one drawing. Actually the reactor is symmetrical about a plane passing through its center. Referring now to FIG. 1, a central island 1 of moderator material (beryllium in this example) is surrounded by a spherical mass of moderator material 2, also beryllium, thereby forming an annular fuel passageway 3. The entire assembly is surrounded by an Inconel pressure shell 4 which defines a return extension 5 of the fuel pasageway 3. A fuel pump 6, communicating with the fuel passageway 3 and 5, is provided to circulate the liquid fuel downwardly through the fuel annulus 3 and then upwardly through the return fuel passageway 5. As the fuel passes downwardly through the annulus 3, a critical mass is achieved and a fission reaction is maintained at all times within the annulus. Energy is released as a result of the fission reaction and produces a temperature rise in the liquid fuel. After being heated in the fuel annulus the fuel then passes into the return pasageway 5 where it is cooled by a spherical heat exchanger 7. The heat exchanger 7 is composed of a plurality of small Inconel tubes 8 which are wrapped around the moderator mass 2 following a helical path of varying pitch from the heat exchanger inlet 9 to the heat exchanger outlet 10. A relatively cool stream of a sodium-potassium mixture (NaK) is introduced at the heat exchanger inlet 9 and is circulated through the Inconel tubes 8 to an outlet 10. The NaK is then circulated to an external heat exchanger where it is cooled before being returned to the reactor core. After being cooled by the fuel heat exchanger 7, the fuel is returned to the fuel pump 6 to begin another flow cycle. The fuel system is provided with a fuel drain line 11 and a fuel expansion tank 12. As has been stated previously, FIG. 1 is not a sectional view taken along one vertical plane, but a sectional view along a plane selected so that all core components are cut at least once, the actual plane along which the sectional view is taken being shown as 1—1 in FIG. 2. Actually there are two fuel pumps to provide proper circulation for the entire fuel passageway.

Since the moderator bodies 1 and 2 are exposed to intense neutron and gamma radiation, internal heating occurs within these masses. In order to avoid moderator damage from excessive heating, a moderator coolant system is provided. The central island 1 is encased by an Inconel shell 13 which is held away from the island by a plurality of spacers 14, thereby defining a moderator coolant passageway 15. The island is provided with a plurality of internal passageways 16 which communicate with the wall passageway 15. Within and adjacent the outer pressure shell 4, an Inconel liner 17 is provided which, in combination with the pressure shell, defines a wall-coolant passageway 18. The passageway 18 communicates with the island passageways 15 and 16 and serves as a return line to the top of the reactor.

In an analogous manner, the outer reflector-moderator 2 is encased in an Inconel liner 19 which is maintained away from the moderator by spacers 20 thereby forming a wall passageway 21. The moderator mass 2 is also provided with a plurality of internal passageways 22 which are connected to the wall passageway 21.

All moderator-collant passageways 15, 16, 18, 21 and 22 communicate with a moderator-coolant pump 23 (see FIG. 3) and a moderator-coolant heat exchanger 24. Referring now to FIGS. 1 and 2, the operation of the moderator-coolant system will be described. The moderator coolant (Na) leaves the pump 23 and a portion is circulated to the island through a duct 25 and the control rod thimble 26. The coolant then flows downwardly through the island passageways 15 and 16 where it is heated by the island. From the bottom of the island, the coolant is returned to the pump and heat exchanger through the pressure-shell passageway 18 where it cools the pressure shell.

The other portion of the moderator coolant is pumped to the reflector-moderator 2. It circulates downwardly along the portion of the passageway 21, which is adjacent the core, and downwardly through the internal passageways 22. The coolant then returns to pump through passageway 21a which is adjacent the return fuel passageway 5. At the top of the reactor, the moderator-coolant is passed over the moderator-coolant heat exchangers 24 which remove the heat from the coolant. The heat exchangers 24 are arcuate in shape, lie in a horizontal plane adjacent the pressure shell, and are fabricated from small diameter Inconel tubing. NaK flowing through the Inconel tubing serves as the secondary coolant. A moderator-coolant drain 27 is provided at the bottom of the reactor and a moderator-coolant expansion tank 28 is provided at the top of the reactor immediately above the fuel expansion tank 12. As in the case of the fuel pumps, two moderator-coolant pumps are required.

Figure 3:
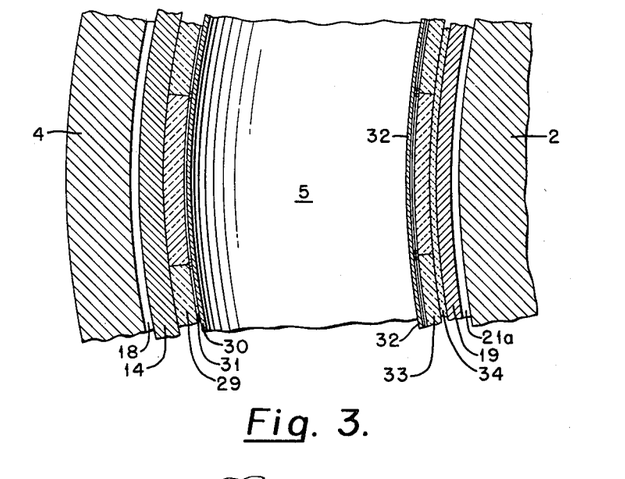
FIG. 3 is a vertical detail section of the fuel heat exchanger-channel space and surrounding walls taken along line 3—3 of FIG. 1.

FIG. 3 is a detail sectional view, taken along line 3—3 of FIG. 1, of the fuel-heat-exchanger channel space 5 and surrounding walls. The Inconel pressure shell 4 and the pressure shell liner 14 form the sodium passageway 18. Adjacent the pressure shell liner 14 are a layer of B$_4$C tile 29 and a boron layer 30 separated by a shim gap 31. Across the heat exchanger channel space 5 is an Inconel shell 32, another layer of B$_4$C tile 33, a layer of copper-B$_4$C cermet 34, the Inconel liner 19 and the beryllium reflector mass 2. The moderator-coolant passageway 21 is formed by shell 19 and the moderator mass 2. The boron containing layers are supplied for shielding purposes.

Referring now to FIG. 4 which is a detailed view of the fuel annulus 3 and the header arrangement 35, the ends 36 and 37 of the inlet header 35 are connected to the fuel pumps 6 (not shown in FIG. 3). It can be seen that the fuel annulus is a divergent-convergent annular passageway which is symmetrical about a horizontal equatorial plane. The annulus is formed by the surfaces of the reflector-moderator body 2 and the island 1, the surfaces being surfaces of revolution generated by cosine curves. Table I below gives the horizontal radii of the annulus at various latitudes.

TABLE I

| No. of Inches Above Equator Towards Inlet | Radius of Island from Centerline in Inches | Radius of Outer Annulus Wall (core) in Inches |
|---|---|---|
| 18 | 3.405 | 5.500 |
| 17 | 3.405 | 5.628 |
| 16 | 3.405 | 5.805 |
| 15 | 3.435 | 6.025 |
| 14 | 3.515 | 6.295 |
| 13 | 3.627 | 6.610 |
| 12 | 3.780 | 6.958 |
| 11 | 3.962 | 7.327 |
| 10 | 4.160 | 7.730 |
| 9 | 4.380 | 8.140 |
| 8 | 4.600 | 8.551 |
| 7 | 4.785 | 8.952 |
| 6 | 4.943 | 9.322 |
| 5 | 5.085 | 9.663 |
| 4 | 5.195 | 9.955 |
| 3 | 5.275 | 10.186 |
| 2 | 5.338 | 10.355 |
| 1 | 5.370 | 10.453 |
| Equator or 0 | 5.376 | 10.500 |

Since the power of the reactor is generated within the fuel annulus, good flow characteristics are necessary in order to avoid areas of stagnation which would yield local overheating of the fuel. In a divergent passageway, the flow of fluid is subject to separation and reversal of boundary layers. In order to avoid this problem, guide vanes 38, shown in FIG. 4, have been provided to reduce the swirling motion imparted to the incoming fuel by the fuel pumps. A sufficient volume of fuel is supplied to the header immediately above the guide vanes so that the header remains filled with a rotating fuel supply. The guide vanes impart a swirl to the fuel so that the fuel traverses the annulus in a path as shown by the arrows in FIG. 4. In addition, to guide vanes, a drag ring 39 is added on the underside of the vanes in order to eliminate flow reversal along the island wall. Although this embodiment is shown with a continuous annular portion, the principles of our invention are retained in reactors having fuel channels which have longitudinal separators.

Figures 5, 6:
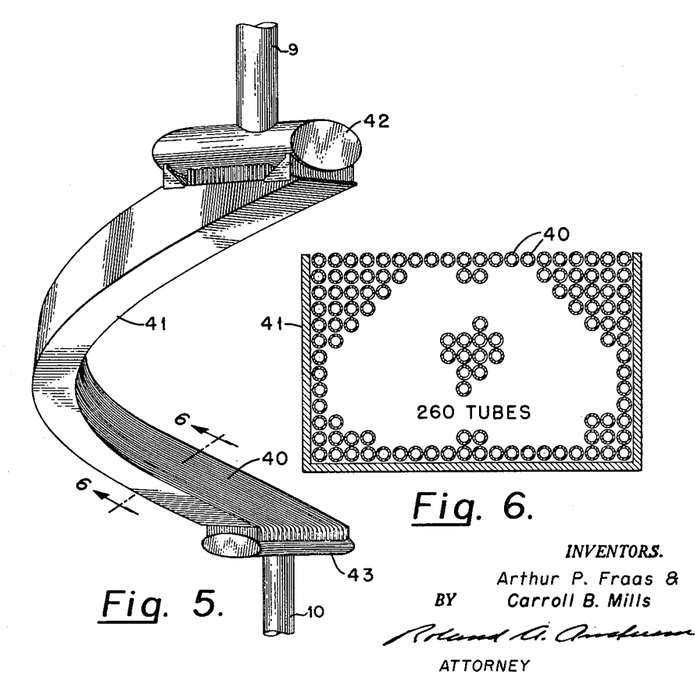
FIG. 5 is a pictorial view of one element of the fuel-to-secondary coolant heat exchanger.
FIG. 6 is a sectional view of one element of the fuel-secondary coolant heat exchanger.

Referring now to FIG. 5 which is a view of one element of a fuel to NaK heat exchanger, and FIG. 6, which is a sectional view of FIG. 5, a plurality of Inconel tubes 40 are enclosed by an Inconel channel 41. The tubes terminate in headers 42 and 43, header 42 being the inlet and header 43 being the outlet. NaK enters the inlet header 42 through inlet tube 9 and leaves the outlet header 43 through outlet tube 10. The heat exchanger is designed to fit closely around the outer extremity of a sphere, therefore a view of the heat exchanger looking along a line parallel to the axis of either the inlet pipe or the outlet pipe would show the channel as an arcuate member. Actually, the channel follows a helical path of variable pitch, the pitch being selected so that the tube spacing will be uniform irrespective of latitude. FIGS. 5 and 6 show a bundle containing 260 tubes arranged rectangularly in a 13 x 20 tube pattern. Twelve bundles of this type are used in the reactor, the bundles being disposed in such a way that inlet tubes 9 and outlet tubes 10 lie on 30° centers about the reactor center within the annular passageway 5 and are substantially parallel to the vertical center-line on the island 1.

A condition of constant tube spacing irrespective of latitude will exist when the helical path satisfies the equation $\sin \phi \cos \theta = K$ where: $\phi$=tube inclination angle, at any point along the tube, between the tube and the latitudinal plane passing through that point; $\theta$=latitude of said point; and $k$=constant.

Figure 7:
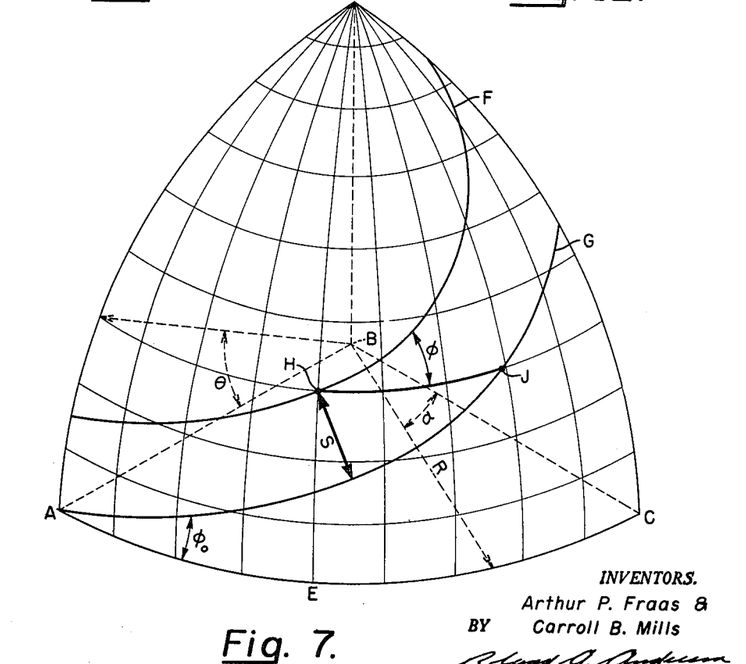
FIG. 7 is a diagram showing two heat exchanger tubes traversing one quadrant of a hemisphere.

FIG. 7 shows the angles $\phi$ and $\theta$ referred to above. F and G are two parallel tubes traversing the spherical section.

Figure 8:
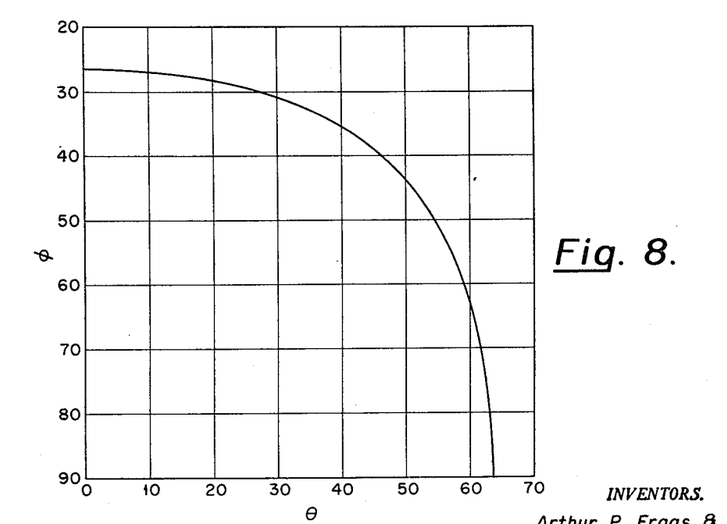
FIG. 8 is a graph relating the heat-exchanger-tube inclination angle ($\phi$) to latitude ($\theta$)
Figure 9:
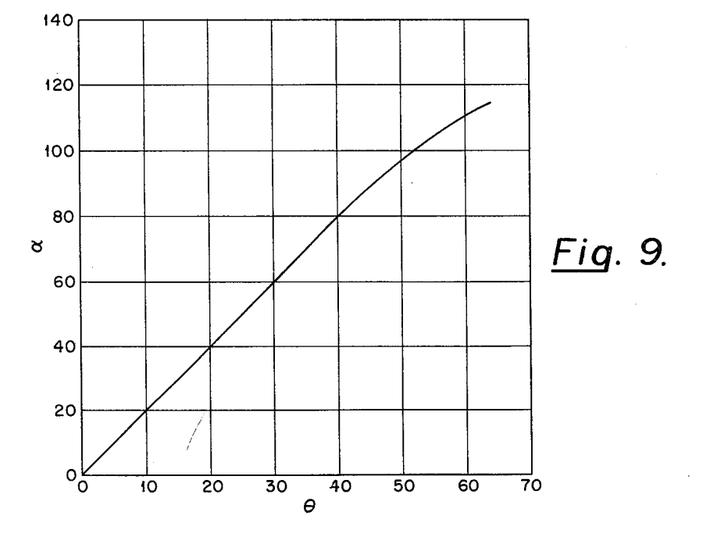
FIG. 9 is a graph relating latitude ($\theta$) to longitude ($\alpha$) for one heat exchanger.

Referring now to FIG. 8, the angle $\phi$, which is the angle between the tube and a plane of latitude at any point along the tube, is shown as a function of the latitude $\theta$. Using FIG. 8 conjunctionally with FIG. 9, which shows the tube longitude $\alpha$ as a function of latitude $\theta$, the heat exchanger configuration can be plotted. The critical dimensions of the fuel-to NaK heat exchanger are given in Table II of this application.

A more complete discussion of this heat exchanger may be found in the co-pending application of the common assignee, Serial No. 700,721, filed December 4, 1957, in the names of Arthur P. Fraas and George F. Wislicenus for Heat Transfer Means, now Patent No. 2,991,980.

Figure 10:
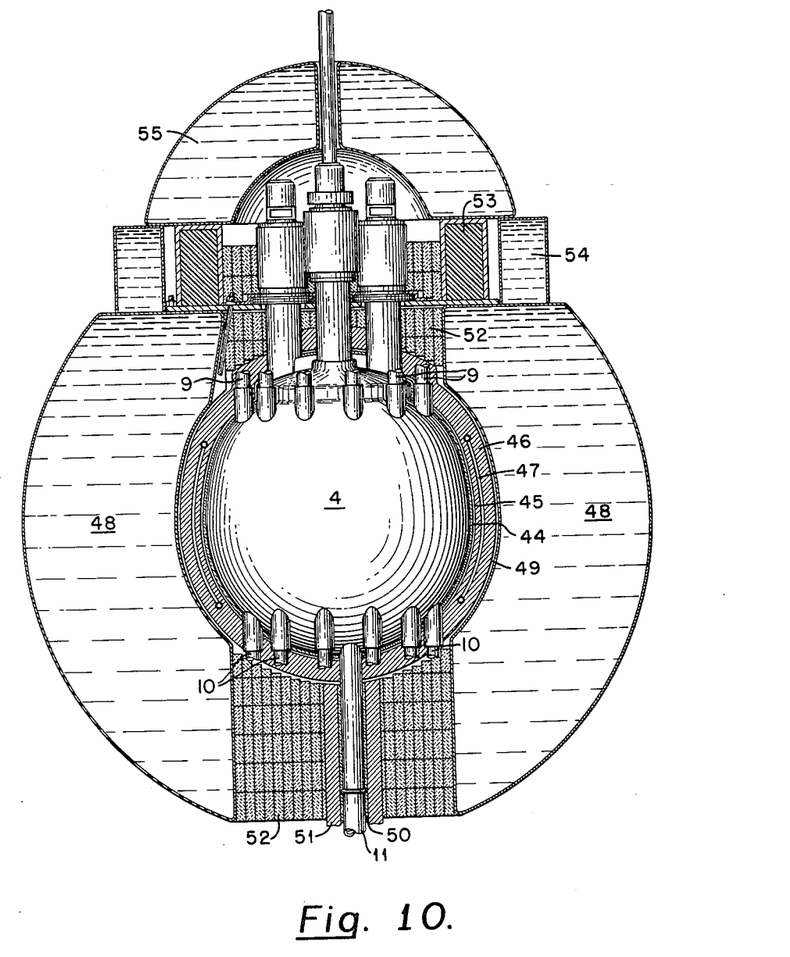
FIG. 10 is a vertical cross-section of the reactor shielding.

Referring now to FIG. 10 which is a vertical section through the shield, the reactor core, encased by the pressure shell 4, is surrounded by one-half inch of thermal insulation 44. Immediately around the thermal insulation is a one-half inch air gap 45 which is in turn surrounded by a 4.3 inch thick lead gamma-ray shield 46. Passageways 47 are provided in the lead shield for cooling water. The lead shield is enclosed by a 33 inch thick layer of borated water 48 which is separated from the lead shield by a one-half inch air gap 49. The fuel drain line 11 is shielded by a one-half inch layer of thermal insulation 50, a three inch thick lead gamma-ray shield 51, and a layer of hexagonal cans filled with LiOH 52. The top of the reactor is shielded by canned LiOH 52, a layer of paraffin 53, a ten inch thick borated water shield 54, and an eighteen inch thick borated water shield 55. In this particular reactor, the borated water is contained in aluminum tanks.

The shielding of this reactor is simplified because of the unique design of the fuel heat exchangers. Being disposed in a layer around the active core, the fuel heat exchangers function as a shield, thereby reducing the amount of shielding necessary on the outside of the pressure shell. The material in the heat exchanger shell is about 70% as effective as water for the removal of fast neutrons. The shielding is designed to give 10 r./hr. at a point fifty feet from the center of the reactor core.

Critical dimensions of this one embodiment of a reactor and its accessories are given in Table II below.

TABLE II

*Reactor dimensions*

REACTOR-CROSS SECTION EQUATORIAL RADII (IN.)

Control rod thimble:
  Inside ------------------------------------- 0.750
  Thickness --------------------------------- 0.062
  Outside ------------------------------------ 0.812
Sodium passage:
  Inside ------------------------------------- 0.912
  Thickness --------------------------------- 0.130
  Outside ------------------------------------ 0.942
Beryllium:
  Inside ------------------------------------- 0.942
  Thickness --------------------------------- 4.121
  Outside ------------------------------------ 5.063
Sodium passage at island:
  Inside ------------------------------------- 5.063
  Thickness --------------------------------- 0.188
  Outside ------------------------------------ 5.251
Inconel shell:
  Inside ------------------------------------- 5.251
  Thickness --------------------------------- 0.125
  Outside ------------------------------------ 5.376
Fuel:
  Inside ------------------------------------- 5.376
  Thickness --------------------------------- 5.124
  Outside ------------------------------------ 10.500
Outer core shell:
  Inside ------------------------------------- 10.500
  Thickness --------------------------------- 0.125
  Outside ------------------------------------ 10.625
Sodium passage at land:
  Inside ------------------------------------- 10.625
  Thickness --------------------------------- 0.188
  Outside ------------------------------------ 10.813
Beryllium reflector:
  Inside ------------------------------------- 10.813
  Thickness --------------------------------- 10.855
  Outside ------------------------------------ 21.668
Sodium passage:
  Inside ------------------------------------- 21.668
  Thickness --------------------------------- 0.125
  Outside ------------------------------------ 21.793
Inconel shell:
  Inside ------------------------------------- 21.793
  Thickness --------------------------------- 0.240
  Outside ------------------------------------ 22.033
Stainless-steel-clad copper $B_4C$ cermet:
  Inside ------------------------------------- 22.033
  Stainless steel thickness------------------- 0.010
  Copper-$B_4C$ thickness--------------------- 0.080
  Stainless steel thickness------------------- 0.010
  Outside ------------------------------------ 22.133
Stainless-steel-canned $B_4C$:
  Can—
    Inside ---------------------------------- 22.133
    Thickness ------------------------------- 0.005
    Outside --------------------------------- 22.138
  $B_4C$ tile—
    Inside ---------------------------------- 22.138
    Thickness ------------------------------- 0.240
    Outside --------------------------------- 22.378
    Shim gap-------------------------------- 0.029
  Can—
    Inside ---------------------------------- 22.407
    Thickness ------------------------------- 0.005
    Outside --------------------------------- 22.412
    Shim gap-------------------------------- 0.021
Outer reflector shell:
  Inside ------------------------------------- 22.433
  Thickness --------------------------------- 0.062
  Outside (max.)------------------------------ 22.495
Channel ---------------------------------------- 22.500
Tangent to first tube--------------------------- 22.510
Tube radius------------------------------------- 0.115
Center line, first tube------------------------- 22.625
Twelve spaces at 0.250-------------------------- 3.000
Center line, thirteenth tube-------------------- 25.625
Tube radius------------------------------------- 0.115
Circle tangent to thirteenth tube--------------- 25.740
Spacer ----------------------------------------- 0.008
Gap -------------------------------------------- 0.022
Channel:
  Inside ------------------------------------- 25.770
  Thickness --------------------------------- 0.120
  Outside ------------------------------------ 25.890
Gap:
  Inside ------------------------------------- 25.890
  Thickness --------------------------------- 0.030
  Outside ------------------------------------ 25.920
Boron jacket:
  Inside ------------------------------------- 25.920
  Thickness --------------------------------- 0.062
  Outside ------------------------------------ 25.982

TABLE II—Continued
Reactor dimensions—Continued

REACTOR-CROSS SECTIONS, ETC.—Continued

B$_4$C tile:
- Inside ........................................... 25.982
- Thickness ....................................... 0.328
- Outside .......................................... 26.310

Pressure shell liner:
- Inside ........................................... 26.310
- Thickness ....................................... 0.375
- Outside .......................................... 26.685

Sodium gap:
- Inside ........................................... 26.685
- Thickness ....................................... 0.125
- Outside .......................................... 26.810

Pressure shell:
- Inside ........................................... 26.810
- Thickness ....................................... 1.000
- Outside .......................................... 27.810

CORE

- Diameter (inside of outer shell at equator), in .... 21
- Island outside diameter, in ..................... 10.75
- Core inlet outside diameter, in ................. 11
- Core inlet inside diameter, in .................. 6.81
- Core inlet area, in.$^2$ ........................ 58.7
- Core equatorial cross-sectional area, in.$^2$ ... 256.2

FUEL ANNULUS MEASUREMENTS

| No. of Inches Above Equator Towards Inlet | Radius of Island from Centerline in Inches | Radius of Outer Annulus Wall (core) in Inches |
|---|---|---|
| 18 | 3.405 | 5.500 |
| 17 | 3.405 | 5.628 |
| 16 | 3.405 | 5.805 |
| 15 | 3.435 | 6.025 |
| 14 | 3.515 | 6.295 |
| 13 | 3.627 | 6.610 |
| 12 | 3.780 | 6.958 |
| 11 | 3.962 | 7.327 |
| 10 | 4.160 | 7.730 |
| 9 | 4.380 | 8.140 |
| 8 | 4.600 | 8.551 |
| 7 | 4.785 | 8.952 |
| 6 | 4.943 | 9.322 |
| 5 | 5.085 | 9.663 |
| 4 | 5.195 | 9.955 |
| 3 | 5.275 | 10.186 |
| 2 | 5.338 | 10.355 |
| 1 | 5.370 | 10.453 |
| Equator or 0 | 5.376 | 10.500 |

REFLECTOR-MODERATOR REGION

- Volume of beryllium plus fuel, ft.$^3$ .......... 28.2
- Volume of beryllium only, ft.$^3$ ............... 24.99
- Cooling passage diameter, in .................... 0.187
- Number of passages in island .................... 120
- Number of passages in reflector ................. 288

FUEL SYSTEM

Fuel volume, ft.$^3$:
- In 36-in.-long core ............................. 3.21
- In inlet and outlet ducts ....................... 1.410
- In expansion tank when ½ in. deep .............. 0.08
- In heat exchanger ............................... 2.84
- In pump volutes ................................. 0.84
- Total in main circuit ........................... 8.38

Fuel expansion tank:
- Volume (8%), ft.$^3$ ........................... 0.5787
- Width, in ....................................... 13.625
- Length, in ...................................... 32.500

SODIUM SYSTEM

Sodium volume, ft.$^3$:
- In expansion tank ............................... 0.16
- In annular passage at pressure shell ............ 1.60
- In reflector passages (total) ................... 0.90
- In first deck ................................... 0.47
- In pump and heat exchanger ...................... 0.35
- In second deck .................................. 0.42
- In island passages (total) ...................... 0.44
- Total in main circuit ........................... 4.34
- Inside diameter of sodium transfer tube to reflector, in ................................. 2.375
- Inside diameter of sodium transfer tube from reflector, in ................................. 3.875
- Inside diameter of sodium transfer tube to island, in .................................... 1.437
- Area of sodium passage to reflector, in.$^2$ ... 4.426
- Area of sodium passage from reflector, in.$^2$ . 5.847
- Area of sodium passage to island, in.$^2$ ..... 1.619

FUEL-TO-NaK HEAT EXCHANGER

- Tube center-line-to-center-line spacing, in ..... 0.250
- Tube outside diameter, in ....................... 0.229 to 0.231
- Tube inside diameter, in ........................ 0.180
- Tube wall thickness, in ......................... 0.025
- Tube spacer thickness, in ....................... 0.020
- Mean tube length, in ............................ 65.000
- Equatorial crossing angle ....................... 26° 20
- Inlet and outlet pipe inside diameter, in ....... 2.469
- Inlet and outlet pipe outside diameter, in ...... 2.875
- Number of tube bundles .......................... 12
- Number of tubes per bundle, 13 x 20 ............. 260
- Total number of tubes ........................... 3120
- Center-line radius of Nak inlet pipes ........... 19.590
- Center-line radius of Nak outlet pipes .......... 19.590

SODIUM-TO-NaK HEAT EXCHANGER

- Tube center-line-to-center-line spacing, in ..... 0.2175
- Tube outside diameter, in ....................... 0.1875
- Tube inside diameter, in ........................ 0.1375
- Tube wall thickness, in ......................... 0.025
- Tube spacer thickness, in ....................... 0.030
- Mean tube length, in ............................ 28
- Number of bundles ............................... 2
- Number of tubes per bundle, 15 x 20 ............. 300
- Total number of tubes ........................... 600
- Inlet and outlet pipe inside diameter, in ....... 2.469
- Inlet and outlet pipe outside diameter, in ...... 2.875

PUMP-EXPANSION TANK REGION

Vertical distance above equator, in.:
- Floor of fuel pump inlet passage ................ 17.625
- Bottom of lower deck ............................ 19.125
- Top of lower deck ............................... 19.656
- Bottom of upper deck ............................ 24.000
- Center line of fuel pump discharge .............. 21.437
- Center line of sodium pump discharge ............ 26.125
- Top inside of fuel expansion tank ............... 29.25
- Inside of dome .................................. 29.875
- Outside of dome ................................. 30.875
- Top inside of sodium expansion tank ............. 34.312
- Top outside of sodium expansion tank ............ 34.812
- Top of fuel pump mounting flange ................ 47.000
- Top of sodium pump mounting flange .............. 50.243

Dome radius, in.:
- Inside .......................................... 29.875
- Outside ......................................... 30.875

TABLE II—Continued
Reactor dimensions—Continued

FUEL PUMPS

| | |
|---|---|
| Center-line-to-center-line spacing, in | 21 |
| Volute chamber height, in | 4.375 |
| Estimated impeller weight, lb | 11 |
| Critical speed, r.p.m. | 6000+ |
| Shaft diameter, in | 2.250 |
| Shaft overhang, in | 14.750 |
| Distance between bearings, in | 12 |
| Impeller diameter, in | 5.750 |
| Impeller discharge height, in | 1.000 |
| Impeller inlet diameter, in | 3.500 |
| Shaft length (over-all), in | 31½ |
| Shaft outside diameter between bearings, in | 2⅜ |
| Lower bearing journal outside diameter, in | 3.400 |
| Shaft outside diameter below seal, in | 2¼ |
| Thrust bearing height from equator, in | 48.125 |
| Number of vanes in impeller | 5 |
| Diameter of top positioning ring, in | 6.200 |
| Diameter of bottom positioning ring, in | 6.190 |
| Outer diameter of top flange, in | 10.000 |

SODIUM PUMP

| | |
|---|---|
| Center-line-to-center-line spacing, in | 23.000 |
| Volute chamber height, in | 2.500 |
| Estimated impeller weight, lb | 10 |
| Critical speed, r.p.m. | 6000+ |
| Shaft diameter, in | 2.250 |
| Center-line lower bearing to center-line impeller, in | 13.3 |
| Distance between bearings, in | 12 |
| Impeller diameter, in | 5.750 |
| Impeller discharge height, in | 0.250 |
| Impeller inlet diameter (1D), in | 3.500 |
| Shaft length (over-all), in | 31.5 |
| Shaft outside diameter between bearings, in | 2.375 |
| Lower bearing journal outside diameter, in | 3.400 |
| Shaft outside diameter below seal, in | 2.25 |
| Thrust bearing height above equator, in | 51.907 |
| Number of impeller vanes | 10 |
| Diameter of top positioning ring, in | 6.200 |
| Diameter of bottom positioning ring, in | 6.190 |
| Outside diameter of top flange, in | 10.000 |

Figure 12:
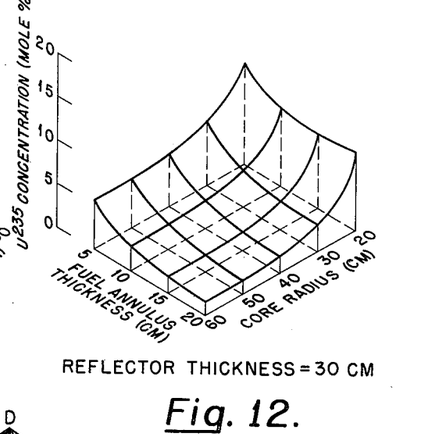
FIG. 12 is a graph showing the effect of reactor dimensions upon the concentration of $U^{235}$ required in the reactor fuel.

The dimensions given in Table II are the dimensions of a preferred embodiment, but changes can be made to suit each reactor application. FIG. 12 is a three dimensional graph showing the relationship between fuel-annulus thickness, core radius, and $U^{235}$ concentration required for criticality. These relationships are plotted for reactors having a constant reflector thickness of 30 cm. It can be seen that the $U^{235}$ concentration necessary for criticality increases with a decrease in either or both of the other variables. It has been discovered that any decrease from a reflector thickness of 30 cm. results in an increase in the $U^{235}$ concentration required. An increase in the reflector thickness from 30 cm. has little effect on the uranium concentrations as compared to the 30 cm. reflector-thickness values.

Figure 11:
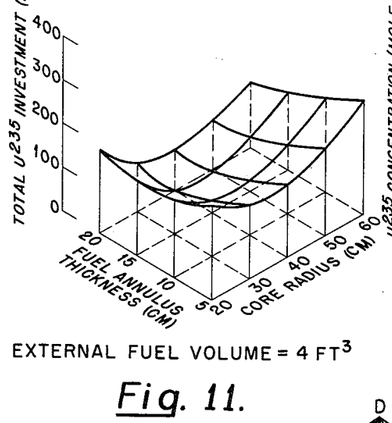
FIG. 11 is a graph showing the effect of reactor dimensions on total $U^{235}$ inventory required in the reactor.

FIG. 11 is a graph showing the effect of reactor dimensions on total $U^{235}$ investment. The data are plotted for an external fuel volume of four cubic feet. External fuel volume is that volume of fuel which occupies the space in the reactor which is external to the fuel annulus. The external volume includes the heat exchanger volume, pump volumes, and the volume of the fuel expansion tank. An inspection of FIG. 11 reveals that an optimum point exists at a fuel annulus thickness of 15 cm. and a core radius of approximately 30 cm. It is to be understood that the optimum point as illustrated in FIG. 11 may not be an optimum point for all reactor applications. For example, an aircraft designer may be willing to accept a higher uranium investment in order to obtain a reactor having a smaller core radius. In terms of operability of the reactor in any given application, it is quite possible that the optimum point for that application may be the worst point in terms of uranium investment. FIGS. 11 and 12 are not given in order to define specific ranges of operability of our invention, but are given as merely illustrative examples of the effect of reactor dimensions on other reactor variables.

Reverting now to FIG. 1, a control or regulating rod 56, driven by conventional means is provided. Control of this reactor is unique in that a master-slave relationship between the load and the reactor makes the reactor virtually self-controlling. Operating at the design point, a decrease in the load on the reactor will effect a temperature rise which will in turn cause a thermal expansion of the liquid fuel. The expansion of the fuel will result in a decrease in the reactivity in the reactor, thereby dropping the temperature back to the design level. An increase in the load on the reactor would initiate a chain of circumstances which would lead to eventual adaptation of the reactor to the new increased load in an analagous manner. The control or regulating rod 56 is used in this reactor mainly for adjusting the operating temperature of the reactor and for overriding neutron poisons which may be built up as a consequence of operation. In addition, the control system is so designed that if the temperature of the fuel exceeds 1600° F. the rod will be inserted automatically to halt the reaction.

Heat generated in the reactor and subsequently transferred to the secondary coolant (NaK) may be removed in any manner compatible with the end result toward which the reactor is applied. For example, the hot secondary coolant may be used to generate high pressure steam with which electrical power can be generated. If the reactor is adapted for aircraft propulsion, a turboprop cycle can be used. In this cycle, the secondary coolant is circulated through radiators, through which air may be directed by a compressor. Energy is transferred to the air by the hot radiator, and the resultant high pressure air is then allowed to expand through a turbine which extracts the energy of the air and utilizes a portion of this energy to drive the compressor. A propeller which is attached to the turbine shaft, is turned by the turbine, thereby effecting a means for driving the aircraft. Also, a turbo jet cycle may be utilized. In this arrangement, the heated air is passed through a turbine which is only large enough to drive the compressor. The turbine extracts only a portion of the total available energy so that the remainder can be used to develop a thrust as the high pressure gas is exhausted in a rearward direction from the aircraft.

In operation of the reactor, the secondary coolant system is filled with the coolant (NaK) and the NaK pumps are started. This operation is performed with no load on the reactor. Energy to heat the system to 1200° F. is provided in part by the NaK pumping power with the remainder being provided by any convenient external means such as electrical heaters. During the heating period, sodium is added to the reflector-moderator coolant system when the system is at 350° F. The sodium moderator coolant pumps are then started and the reactor is heated to the 1200° F. point.

Figure 13:
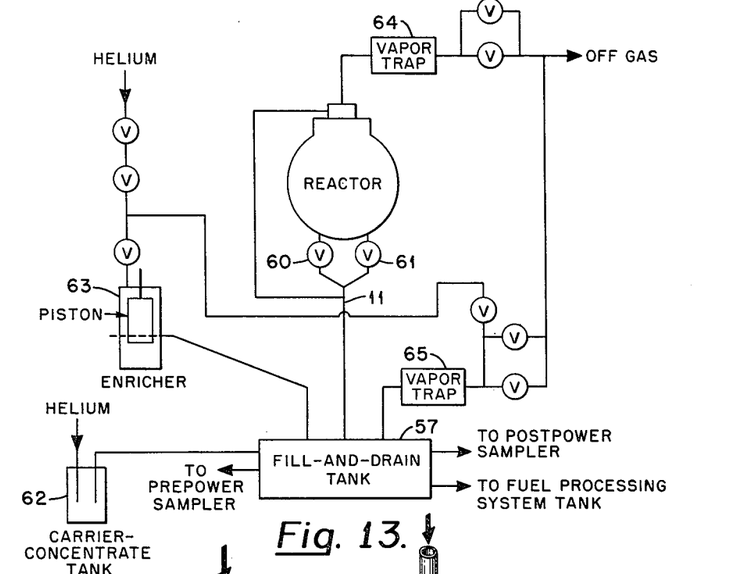
FIG. 13 is a schematic flow diagram of the fuel fill-and-drain system.
Figure 14:
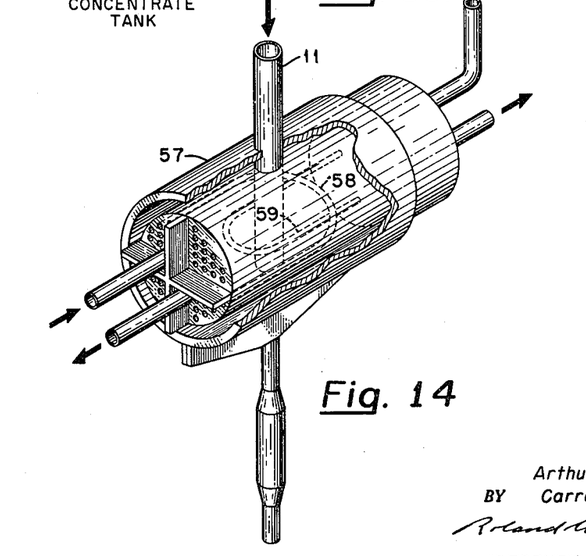
FIG. 14 is a pictorial view of the reactor fuel fill-and-drain tank.

Referring now to FIG. 13 which is a schematic drawing of the fuel fill-and-drain system and to FIG. 14 which is a pictorial view of the fill-and-drain tank, the fuel drain lines 11 are shown leaving the bottom of the reactor and entering the fuel fill-and-drain tank 57. Two coolant lines 58 and 59 are shown within the tank. The fuel drain line 11 enters the tank at the top and terminates within the tank shell. Returning now to FIG. 13, dump valves 60 and 61 are provided in the fuel drain lines 11 immediately below the reactor. The drain system is designed so that the reactor can be drained by gravity in three minutes even in the event that one dump valve fails to operate. A tank 62 is included in the system for the introduction of the barren fuel carrier ($NaZnF_5$) and initial batch of concentrate ($Na_2UF_6$).

One fuel which is suitable for use in this reactor is a mixture containing 50 mole percent NaF, 46 mole percent $ZrF_4$, and 4 mole percent $UF_4$, which is, essentially, a solution of $Na_2UF_6$ in $NaZnF_5$. It has been discovered that fuels containing an alkali fluoride, zirconium tetrafluoride, and either uranium tetrafluoride or uranium trifluoride will function as a fuel for reactors of this type. Table III lists the physical properties of several representative fuels. A more complete description of the properties of fluoride fuels may be found in the co-pending application of the common assignee, Serial No. 600,639, filed July 27, 1956, in the names of Charles J. Barton and Warran R. Grimes for "Reactor Fuel Composition," now Patent No. 2,920,024.

operating specifications of the reactor as given below in Table IV.

TABLE IV
*Design data*

POWER

| | |
|---|---|
| Design heat output (kw.) | 60,000. |
| Core heat flux | Heat transported out by circulating fuel. |
| Core power density (max./avg.) | 2:1. |
| Power density, maximum (kw. per liter of core). | 1,300. |
| Specific power (kw. per kg. of fissionable material in core). | 940. |
| Power generated in reflector (kw.) | 2,040. |
| Power generated in island (kw.) | 600. |
| Power generated in pressure shell (kw.) | 210. |
| Power generated in lead layer (kw.) | 132. |
| Power generated in water layer (kw.) | 4. |

TABLE III
*Physical properties of representative fuels*

| Composition, Mole Percent | Approximate, Melting Point, °C. | Heat Capacity, cal./gm. °C. | Thermal Conductivity, B.t.u./hr. ft.² (°F./ft.) | Viscosity, Centipoises | Density, gm./cc. (T=°C.) |
|---|---|---|---|---|---|
| NaF—50<br>$ZrF_4$—46<br>$UF_4$—4 | 520 | 0.26 at 700° C. | 1.5 | 9.3 —600° C.<br>6.05—700° C.<br>4.25—800° C. | =3.93—.00093 T. |
| NaF—53.5<br>$ZrF_4$—40<br>$UF_4$—6.5 | 540 | 0.24 | 1.2 | 8.5—600° C.<br>5.6—700° C.<br>4.0—800° C. | =4.04—.0011 T. |
| LiF—55<br>NaF—20<br>$ZrF_4$—21<br>$UF_4$—4 | 545 | 0.33 | | 12.0—600° C.<br>7.0—700° C.<br>4.45—800° C. | =3.49—.00085 T. |
| RbF—48<br>$ZrF_4$—48<br>$UF_4$—4 | 425 | 0.21 | 1.2 | 7.2—600° C.<br>4.7—700° C.<br>3.3—800° C. | =4.00—.00093 T. |
| NaF—50<br>$ZrF_4$—25<br>$UF_4$—25 | 610 | 0.27 | | 8.5—700° C.<br>5.0—800° C.<br>3.5—900° C. | =5.09—.00159 T. |
| KF—50.1<br>NaF—4.8<br>$ZrF_4$—41.3<br>$UF_4$—3.8 | 540 | 0.28 | | | =4.27—.00163 T. |

An enricher 63 is supplied for subsequent additions of $Na_2UF_6$. A portion of the off-gas system is shown in FIG. 13. Vapor traps 64 and 65 are included to trap out $ZrF_4$ from the gaseous fission products which are diluted by helium before introduction into the off-gas system. After passing through the $ZrF_4$ traps, the off-gases are sent to a charcoal adsorption bed (not shown) where they are detained until the radioactivity is at a safe level for discharge into the air.

Returning now to the description of the operation of the reactor, the barren fuel carrier is introduced to the system by means of tank 62, after the system has reached an isothermal condition at 1200° F. The fuel carrier is then pressurized into the reactor core where it is circulated by the fuel pumps. After the system has been degassed by circulation, the dump valves 60 and 61 are opened and the fuel carrier is allowed to enter the fill-and-drain tank. A small amount of the fuel concentrate, which carries the $U^{235}$, is added to the fuel carrier at this point and the mixture is again pressurized into the reactor core. By opening the dump valves and pressurizing alternately, the carrier and concentrate are mixed. Further additions of concentrate are made at the enricher in small increments until criticality is achieved with the control rod partially withdrawn. The control rod is then partially withdrawn to allow the reactor to reach the designed mean-fuel-temperature and a load is gradually applied to the reactor by circulating air through the radiators. After the design temperature has been reached, the control rod is inserted to a position such that the effective multiplication factor of the system is equal to unity. By inserting the control rod 56, thereby lowering the fuel temperature to 1200° F., and removing the load at this temperature the reactor can be shut down and the fuel dumped. The reactor has been designed to achieve criticality with 23 kg. of $U^{235}$ in the channel 3 with a total $U^{235}$ inventory of 64 kg. These values are included in the design data and

MATERIALS

| | |
|---|---|
| Fuel | NaF—$ZrF_4$—$UF_4$ (50—46—4 mole percent). |
| Reactor structure | Inconel. |
| Moderator | Beryllium. |
| Reflector | Beryllium. |
| Shield | Lead and borated water. |
| Primary coolant | The circulating fuel. |
| Reflector coolant | Sodium. |
| Secondary coolant | NaK. |

FUEL SYSTEM PROPERTIES

| | |
|---|---|
| Uranium enrichment (percent $U^{235}$) | 93.4. |
| Critical mass (kg. of $U^{235}$) | 23. |
| Total uranium inventory (kg. of $U^{235}$) | 64. |
| Consumption at maximum power (g./day) | 88. |
| Design lifetime (hr.) | 1,500. |
| Design time at maximum power (hr.) | 500. |
| Burnup in 500 hr. at maximum power (percent). | 2.9. |
| Fuel volume in core (ft.³) | 3.2. |
| Total fuel volume (ft.³) | 10. |

NEUTRON FLUX DENSITY IN CORE

| | |
|---|---|
| $10^4$ ev. $<$ E $<10^7$ ev. (neutrons·cm.⁻²·sec.⁻¹) | $3\times10^{15}$. |
| Thermal$<$E$<10^4$ ev. (neutrons·cm.⁻²·sec.⁻¹) | $1\times10^{15}$. |
| Thermal, maximum (neutrons·cm.⁻²·sec.⁻¹) | $2\times10^{14}$. |
| Thermal, average (neutrons·cm.⁻²·sec.⁻¹) | $5\times10^{13}$. |

CONTROL

| | |
|---|---|
| Shim control | One rod of 5% $\Delta k/k$. |
| Rate of withdrawal | $3.3\times10^{-4}$ $\Delta k/k$·sec. |
| Temperature coefficient (over-all) | $-2.3\times10^{-5}(\Delta k/k)/°$ F. |
| Temperature coefficient (fast) | $-5\times10^{-5}(\Delta k/k)/°$ F. |
| Thermal fissions (percent) | 40. |
| Neutron leakage (percent) | 32. |
| Prompt neutron lifetime (sec.) | 400. |
| $k_{eff}$ (clean, as loaded) | 1.04. |
| $\Delta k$ (temperature) | 0.004. |
| $\Delta k$ (poisons) | 0.036. |
| $k_{eff}$ (hot and poisoned) | 1.00. |
| Conversion ratio | 0. |

TABLE IV—Continued
Design data—Continued
CIRCULATING FUEL COOLANT SYSTEMS

| Fuel in core: | |
|---|---|
| Outlet temperature (° F.) | 1,600. |
| Temperature rise (° F.) | 350. |
| Means flow velocity (f.p.s.) | 5. |
| Reynolds number (for mean axial velocity). | 85,000. |
| Fuel-to-NaK heat exchanger: | |
| Volume of fuel (ft.³) | 2.45. |
| Volume of NaK in tubes (ft.³) | 2.97. |
| Volume of Inconel in tubes (ft.³) | 1.88. |
| Inconel tube surface in contact with fuel (ft.²). | 903. |
| Heat exchanger thickness (in.) | 3.25. |

| | Fuel | NaK Coolant |
|---|---|---|
| Maximum temperature (° F.) | 1,600 | 1,500. |
| Temperature drop (or rise) (° F.) | 350 | 430. |
| Pressure drop (p.s.i.) | 39 | 13. |
| Flow rate (ft.³/sec.) | 2.96 | 10.45. |
| Velocity through the tube matrix (f.p.s.) | 8.77 | 24. |
| Reynolds number | 3,740 | 120,000. |
| Heat transfer coefficient (B.t.u./hr·ft.²·° F.) | 2,215 | 10,000. |

| Cooling system for NaK-fuel coolant: | |
|---|---|
| Maximum air temperature (° F.) | 750. |
| Ambient airflow through NaK radiators (c.f.m.). | 243,000. |
| Radiator air pressure drop (in. H₂O) | 9. |
| Blower power required (total for four blowers) (H.P.). | 600. |
| Total radiator inlet face area (ft.²) | 100. |
| Cooling system for moderator: | |
| Maximum temperature of sodium (° F.). | 1,250. |
| Sodium temperature drop in heat exchanger (° F.). | 200. |
| NaK temperature rise in heat exchanger (° F.). | 250. |
| Pressure drop of sodium in heat exchanger (p.s.i.). | 7. |
| Pressure drop of NaK in heat exchanger (p.s.i.). | 7. |
| Flow rate of sodium through reflector (ft.³/sec.). | 1.35. |
| Flow rate of sodium through island and pressure shell (ft.³/sec.). | 0.53. |
| Flow velocity of sodium through reflector and island (f.p.s.). | 30. |
| Reynolds number of sodium in reflector and island. | 170,000. |

The above described embodiment of our invention may be fabricated in any convenient manner but one convenient assembly scheme is the assembly of the reactor from five major subassemblies. In this embodiment the five major components are the reflector-moderator (reference number 2 in FIG. 1); the main heat exchanger (reference number 7 in FIG. 1); the north head (the assembly shown in FIG. 2); the island (reference number 1 in FIG. 1) and south pressure-shell liner assembly (reference numeral 14 in FIG. 1); and the pressure shell (reference numeral 4 in FIG. 1).

The reflector-moderator 2 is composed of two beryllium hemispheres held together by a ring 66 as shown in FIG. 1. The Inconel liners and boron shielding is placed around the sphere of beryllium to complete the reflector-moderator sub-assembly.

Next, the north head is assembled from the Inconel structural materials, sodium to NaK heat exchangers (reference numeral 24), the fuel and sodium pumps, and the core entrance header. The reflector-moderator sub-assembly and the north head are then welded together while holding the fuel heat exchanger in place around the outer periphery of the reflector moderator.

Next, the island and south pressure-shell liner are fabricated. The island is composed of upper and lower beryllium sections joined at the reactor equator. The upper and lower sections are fitted together and the Inconel shell, held away from the beryllium by spacers, is fitted over the beryllium. An equatorial weld in the Inconel shell completes the island fabrication. The south pressure-shell liner with the shells containing the shielding (reference numerals 14, 29, 30, and 31 in FIG. 3) is then welded to the island to form the fourth subassembly. The island is inserted through the reflector and the north portion of the pressure-shell liner is welded at the equator to the south portion. The pressure shell, in two hemispherical sections, is then placed around the reactor and welded at the equator.

The above description of one assembly scheme is not complete but it is merely a brief outline of one assembly procedure. It is obvious that other schemes are available and deviations will be apparent to one skilled in the art.

The specific reactor embodiment described above is suitable for the propulsion of an aircraft of the Douglas C–133A type. The important specifications for the C–133A are given in Table V below.

TABLE V
C–133A specifications

| | |
|---|---|
| Over-all length | 153 ft. |
| Over-all wingspan | 180 ft. |
| Maximum gross weight | 282,000 lb. |
| Normal gross weight | 255,000 lb. |
| Empty weight | 109,417 lb. |
| Power plant (four used): | |
| Type | Turboprop. |
| Designation | P&W–T–34–P3. |
| Rated power | 5700 eshp. |
| Weight (less tailpipe) | 2564 lb. |
| Fuel capacity | 16,000 gal. |

If it is desired, chemically fueled engines may be used in addition to the nuclear engines for safety reasons. Auxiliary chemical engines will afford a factor of safety so that the nuclear aircraft will not have to rely entirely on nuclear power in its initial test. In addition the chemical engines may be used for rapid acceleration.

A propulsion plant comprising four turboprop engines, each rated at 5700 eshp., is suitable for use with the above-described reactor embodiment. In addition, four J–47 chemical turbojet engines may be included for the auxiliary services outlined above. Table VI below is a weight estimate of a nuclear-powered C–133A.

TABLE VI
Weight estimate of nuclear C–133A

| | Weight (lb.) |
|---|---|
| Airframe, less engines | 99,161 |
| Engines: 4 turboprop @ 4270 lb | 17,080 |
| Radiators: 4 @ 1297 lb | 5,188 |
| NaK piping | 3,429 |
| Reactor (including intermediate heat exchanger, pressure shell, fuel pumps, etc.) | 14,000 |
| NaK pumps and drives | 6,000 |
| Reactor shield | 48,000 |
| Crew shield | 27,000 |
| Increase in structural weight | 10,000 |
| Empty weight of nuclear powered C–133A | 229,858 |
| Installed weight of four J–47 engines | 14,000 |
| Empty weight of C–133A aircraft plus nuclear power plant and auxiliary chemical engines | 243,858 |

Table VII gives the payload estimates for the C–133A. It can be seen that the nuclear-powered C–133A will carry a substantial payload, even with auxiliary chemical power.

TABLE VII
Payload estimate of nuclear C–133A

| | Maximum Payload (lb.) | Normal Payload (lb.) |
|---|---|---|
| C–133A with nuclear | 52,142 | 25,142 |
| C–133A with nuclear and auxiliary chemical power | 38,142 | 11,142 |

The specific reactor which has been described herein is but one of a multitude of designs that can be made utilizing the principles of our invention. The description was given merely as an illustrative example and should not be interpreted in a limiting sense. Since my invention is concerned with the broad principles of nuclear physics as applied to neutronic reactors, it should be limited only as indicated by the appended claims.

Having thus described our invention, what is claimed as novel is:

1. An improved neutronic reactor comprising a central, axially columnar, unitary, substantial mass of neutron moderator, a second mass of substantial thickness of a neutron moderator approximating the configuration of a spherical shell surrounding and substantially spaced from said central mass, thereby forming an annular passageway between said central mass and said surrounding mass, said central mass and surrounding mass comprising the principal neutron moderator of said reactor, a stream of liquid fissionable material adapted to be continuously passed through said annular passageway, and while contained therewithin to engage in a neutron-induced, self-sustained chain fission reaction, said fissionable material being selected from the group consisting of fused salt fuels and liquid metal fuels, and means to cool said stream of fissionable material.

2. The reactor of claim 1 wherein said central mass and said surrounding mass are concentric volumes of revolution.

3. The reactor of claim 1 wherein said central and surrounding masses of moderator are fabricated from beryllium.

4. The reactor of claim 1 wherein said fissionable material comprises at least one alkali metal fluoride, zirconium tetrafluoride, and one uranium fluoride selected from the group consisting of uranium tetrafluoride and uranium trifluoride.

5. The reactor of claim 3 wherein said fissionable material comprises at least one alkali metal fluoride, zirconium tetrafluoride, and one uranium fluoride selected from the group consisting of uranium tetrafluoride and uranium trifluoride.

6. An improved neutronic reactor comprising a central, unitary, substantial mass of neutron moderator, a second mass of substantial thickness of a neutron moderator surrounding and substantially spaced from said central mass, thereby forming a first annular passageway between said central mass and said surrounding mass, said central mass and said surrounding mass comprising the principal neutron moderator of said reactor, a liquid-retaining shell surrounding said central and surrounding moderator masses and substantially spaced from said surrounding moderator mass, thereby forming a second annular passageway between the outer surface of said surrounding moderator mass and the inner surface of said shell, said second annular passageway being in communication with said first annular passageway, heat exchange means disposed in said second annular passageway and adapted to conduct an externally-cooled coolant therethrough, and a stream of liquid fissionable material selected from the group consisting of fused salt fuels and liquid metal fuels and adapted to be continuously circulated through said first annular passageway, and while contained therein to engage in a neutron-induced, self sustained chain fission reaction, and thence through said second annular passageway in heat-exchange relationship with said heat exchange means.

7. The reactor of claim 6 wherein said central mass and said surrounding mass are concentric volumes of revolution.

8. The reactor of claim 6 wherein said central mass is axially columnar in configuration, and wherein said surrounding mass approximates the configuration of a spherical shell.

References Cited in the file of this patent

Nuclear Science and Engineering, vol. 2, page 841, of an article by Bettis et al., paper received June 13, 1957.

U.S. Atomic Energy Commission BAW-2 (Del.), Liquid Metal Fuel Reactor, Technical Feasibility Report, June 30, 1955, pages 71–87, 371–382.

Proceedings of the International Conference on the Peaceful Uses of Atomic Energy, United Nations, N.Y., 1955, Miles et al., vol. 3, pp. 125–133.

Nuclear Science and Engineering, vol. 2, pp. 804–825, November 1957 (Bettis et al.); vol. 2, pp. 582–601, September 1957 (Mars et al.).

Jet Propulsion, vol. 27, No. 7, July 1957, p. 800.